United States Patent [19]

Lerner

[11] Patent Number: 5,157,600

[45] Date of Patent: * Oct. 20, 1992

[54] SYSTEM FOR NUMERICAL DESCRIPTION OF COMPUTER PROGRAM LOGIC

[76] Inventor: Moisey Lerner, 7 Rolling La., Needham, Mass. 02192

[*] Notice: The portion of the term of this patent subsequent to May 23, 2006 has been disclaimed.

[21] Appl. No.: 217,359

[22] Filed: Jul. 11, 1988

Related U.S. Application Data

[63] Continuation-in-part of Ser. No. 43,549, Apr. 28, 1987, Pat. No. 4,833,641.

[51] Int. Cl.[5] .................. G06F 7/00; G06F 7/10; G06F 7/12; G06F 7/38
[52] U.S. Cl. .................. 395/700; 364/274; 364/274.1; 364/275; 364/275.5; 364/275.8; 364/280; 364/280.1; 364/280.4; 364/280.5; 364/DIG. 1
[58] Field of Search ... 364/200 MS File, 900 MS File

[56] References Cited

U.S. PATENT DOCUMENTS

| | | | |
|---|---|---|---|
| 4,387,427 | 6/1983 | Cox et al. | 364/200 |
| 4,468,736 | 8/1984 | De Santis et al. | 364/200 |
| 4,595,981 | 6/1986 | Leung | 364/300 |
| 4,642,767 | 2/1987 | Lerner | 364/406 |
| 4,683,549 | 7/1987 | Takaki | 364/900 |
| 4,730,315 | 3/1988 | Saito et al. | 371/19 |
| 4,833,641 | 5/1989 | Lerner | 364/900 |
| 4,872,167 | 10/1989 | Maezawa et al. | 371/19 |

Primary Examiner—Archie E. Williams, Jr.
Assistant Examiner—Robert B. Harrell
Attorney, Agent, or Firm—Tomin Corporation

[57] ABSTRACT

An improved system of numerical description "in-the-large" of a program logic is used for global analysis of long-lived programs needed for perfective maintenance, including program enhancing and program reusing. Documentation "in-the-large" comprises linear program circuits, each circuit consisting of at least three non-routine logical parts consecutively following each other. A program circuit is individually numbered and its data-processing task is semantically described, creating a linear data flow (LDF). Documentation "in-the-large" is developed from the immediate environment of each logical part, this environment being represented by a numerical description of all links of this part with neighboring logical parts.

5 Claims, 5 Drawing Sheets

SYSTEM FOR NUMERICAL DESCRIPTION OF COMPUTER PROGRAM LOGIC

This is a continuation-in-part of the prior application Ser. No. 07/043,549 filed on Apr. 28, 1987, matured into U.S. Pat. No. 4,833,641 issued on May 23, 1989.

FIELD OF THE INVENTION

The invention relates to perfective maintenance of long-lived computer programs, and more specifically, to data processing methodology and apparatus for effecting an improved numerical description of a logical structure of a large computer program.

BACKGROUND OF THE INVENTION

There exist huge unstructured or badly structured programs, which have been modified over many years and which continue to need maintenance. In many cases long-lived programs are represented by only a running code, with no other reliable external documentation. In order to make these programs (a) easier to read, and (b) easier to analyze impact of changes on a program, it was proposed in our U.S. Pat. No. 4,833,641 to reverse-engineer numerical documentation from a source code without changing a single line of the code. In the first stage of reverse engineering, the program is dissected into formal logical parts. Each part starts with a line to which control over data-processing is transferred from any other logical part in the program, said part ending at a line preceding the entrance of a subsequent logical part, or at a RETURN command if the logical part is a routine. In the second stage of reverse engineering each transfer of control is described by two addresses: (1) an address of an exit of one logical part, and (2) an address of an entrance of a linked logical part. The entrance address is defined by at least three attributes: 1) by an entrance number, which is always 0 (zero), because each part has one and only one entrance, 2) by a part number, and 3) by a label (number) of entrance line. The exit address can be defined only by an exit number and by a part number. A label (number) of exit line is optional if all exits are consecutively numbered from 1 and up starting with the closest exit to a part entrance. Routine logical parts were suggested to number from 500 and up, and non-routine logical parts—from 100 up to 499. This description of a link by at least five attributes is complemented in the third stage of reverse engineering by a semantic description of functioning of each part with the help of part's names. A process of naming transforms a formal logical part into a functional part with or without changing the formal part. In some cases several formal parts, which perform the same function, are integrated into one functional part. In other cases one formal part may be dissected into several functional parts, each of them performing an individual function. Though dissecting a program into formal logical parts can be done by a computer with no human involvement, declaration of functional names requires involvement of a person who is familiar with the program. If a program is written in COBOL language, or if a program is amply supplied with remark statements, then functional parts may be declared without human involvement. A combination of numerical and semantic description of two linked parts creates an informational word. In a collection of informational words each word is consecutively numbered. This collection of informational words (also called a "genetic collection" of links) is used in the forth stage of reverse engineering for creating an immediate environment of each functional part. All links of the genetic collection are searched for those words, which contain a particular part, then these words are printed out being arranged in a consecutive order of entrance/exit numbers. A source code can now be substituted by numbered portions of the code identified as functional logical parts, each part being located on a separate page and complemented by a description with the help of informational words of an immediate environment of this part. A collection of these parts arranged in a consecutive order of part numbers belongs to documentation "in-the-small", called as such because it is directly tied up with the source code. A list of entrances of all functional parts arranged in a consecutive order of entrance labels also belongs to documentation "in-the-small", as well as a genetic collection of links.

Documentation "in-the-small" is powerful enough for conducting corrective program maintenance, which we define as one that either causes no alterations in a program logic, or these alterations are not significant. A change in any logical part can easily be documented supplying all comments about this particular change on a page, where the part is located. Impact of the change can readily be evaluated analyzing immediate environment of the changed part.

A process of creating documentation "in-the-small" can not be realized only by a human without computer involvement. A human has a limited ability to remember which does not commensurate with a huge amount of information that a human receives during his lifetime. In order to protect memory from saturation Nature supplied a human with the ability to get tired and to forget. However, fatigue and forgetfulness cause human mistakes which would flood numerical documentation "in-the-small" if the documentation were created by a human without the help of a computer. Suppose we deal with a program, which has just 200 transfers of control, each one being described by an information word, which has 30 characters, or 6000 characters in total. If we conservatively assume 1% as a level of human erroneousness, we will arrive at 60 mistakes while a collection of all links is created, then another 60 multiplied by n mistakes while immediate environment for each logical part is created (where n shows how many times on average each informational word is repeated in all immediate environments). At a stage of creating documentation a human search for these mistakes is frustratingly ineffective—it is like looking for a needle in a hay stack. Computer memorizes a genetic collection of informational words only. All other collections, like the immediate environment of each part, are derived by a computerized search of this genetic collection. The derived collections make human mistakes conspicuous: for instance, an error in a part number of a particular exit address (say, part 101, exit 1 instead of correct—part 100, exit 1) will be found in the immediate environments of both parts (exit 1 of part 100 will be missing, whereas part 101 will be having two exits 1). After all mistakes conspicuously exhibited by a computer in the documentation "in-the-small" are corrected, the genetic collection will become error-free.

Documentation "in-the-small" is not effective for conducting perfective maintenance, which includes program enhancement or program reusing in order to meet new requirements of a user, and which ordinarily causes substantial alterations in a program logic. A global overview of a program by considering a succession of logical parts, rather than each individual part and its immediate environment, is needed in order to conduct this type of maintenance. These successions of functional parts create program circuits, which constitute documentation "in-the-large".

We address in this invention the problem of developing documentation "in-the-large" from documentation "in-the-small".

SUMMARY OF THE INVENTION

It is an object of this invention to provide a method and means for describing successions of functional parts, and particularly a succession of non-routine logical parts. A succession of parts is like a linear circuit in electrical schematics. A linear program circuit comprises all program statements, which a computer executes performing a certain task of data-processing, the name of this task being used as a name of the program circuit. On the other hand a program circuit is a succession of informational words, which describe links between parts following each other, and since the function of each part is semantically described by a part's name we arrive at a succession of names describing a data flow. A linear program circuit constitutes therefore a linear data flow (LDF), besides being a linear control flow (flow of links). A collection of program circuits belongs to documentation "in-the-large", which is indispensable for global analysis.

In order to formally declare linear program circuits a map of all functional non-routine parts should be drawn. The first linear circuit starts with the beginning logical part of a program. The first circuit is arbitrarily drawn without loops through the succession of logical parts (whether branching or non-branching) until this circuit reaches the end of the program. A linear circuit should have at least two links following each other, which include three logical parts. One link (two parts) does not create a circuit. The first circuit builds a stem of the program to be used for declaring the rest of program circuits. However complicated the first circuit may be, in fact, it will execute a certain mode of program operation.

The second circuit starts from the branching part, which is the closest to the program end. One branch of said part should belong to the first circuit. The second circuit should end at another branching part, or at the end of the program, or at a rooting part which already belongs to another linear circuit. When all branches of the branching part are exhausted for declaration of subsequent program circuits, the procedure of declaration is transferred to the next branching part, one branch of which belonging to the first program circuit. The process of declaring linear program circuits is over when there is no logical part left which belongs to at least one program circuit.

When all linear program circuits are formally declared (drawn and numbered) the process of naming these circuits starts, involving a person familiar with the program. Same as with the formal parts, naming formal circuits may require dissecting some circuits into separate ones, or vice versa-integrating several formal circuits into one program circuit with one name. After program circuits are named, their numbers are incorporated into informational words, creating a separate field for LDF number, or adding a circuit number to a part's name locating, say, a three-digit number (making it possible to have 999 LDFs) before the name of a part.

Obviously only those informational words, which link two logical parts will contain the LDF number. If a link contains a subroutine, there is no LDF number present in this informational word, because any subroutine may be called many times from different logical parts, which belong to different program circuits.

The genetic matrix which contains numbers of program circuits can be used for automatic printout of a linear program circuit, providing the computer with the number and name of the LDF, and also with the numbers of logical parts from which the circuit starts and at which it ends. The computer will find the informational word containing the starting part, print it out, then find the word with a connecting link, which has the same LDF number, and print it out, and so on until the last part is reached.

There are at least two types of linear circuits which can be printed out with the help of a computer. One type of a circuit contains only logical parts and no subroutines. This type of program circuit is helpful for simulating program functioning so far as this functioning is correctly reflected in a genetic collection of links. In case there are no errors present in informational words, which belong to a particular LDF, a complete program circuit will be printed out, otherwise the printout of the circuit will stop before a last part was reached. Apparently, a circuit composed of non-routine logical parts only, can not be used as a description of a data flow, because the names of functions, which routines perform, are missing.

The second type of program circuits contains routines as well as non-routine logical parts. This type of circuits can, in fact, describe a data flow since a circuit printout contains semantic description of all portions of a program involved in executing a particular data-processing task which a given program circuit performs.

Providing an overview of program functioning is not the only advantage of linear program circuits. Another advantage of program circuits is to provide means for simulating program functioning without actually running a program, as it was mentioned above.

Program circuits are also helpful in analyzing a control flow.

Program circuits are advantageous for recording structural changes and pertaining remarks describing causes of changes.

BRIEF DESCRIPTION OF THE DRAWINGS

The foregoing and additional features and advantages of this invention will become more easily understood from the following description of illustrative embodiment thereof taken into conjunction with the accompanying drawings in which.

DESCRIPTION OF THE PREFERRED EMBODIMENTS

Figure 1:
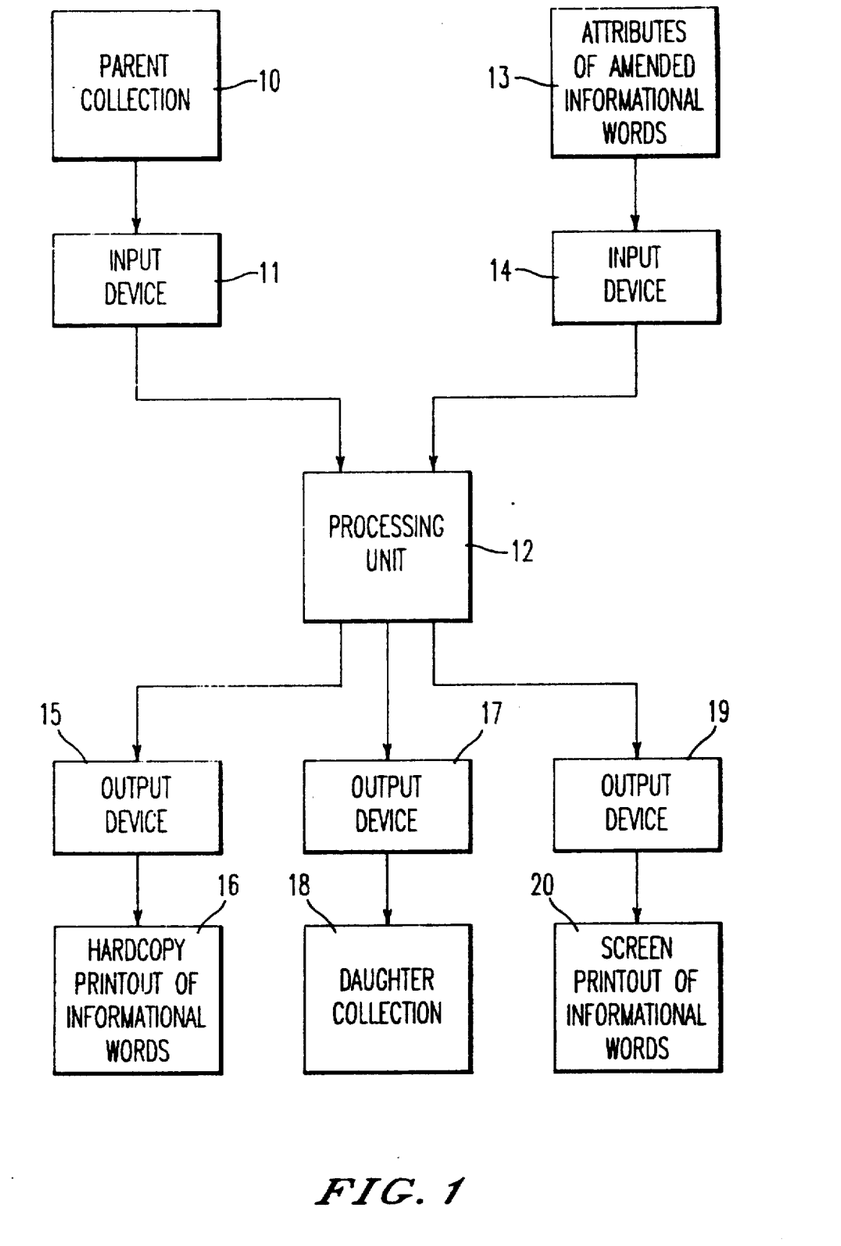
FIG. 1 is a schematic block diagram which represents the invented method and the machine for describing logical structure of a computer program.

Referring now to FIG. 1, there is shown an illustration of one of this principles of the invention. A parent collection of informational words (10) numerically describing links within a computer program, said collection being stored on a magnetic tape and also on other available informational storage means, is entered into processing unit (12) with the help of one of input devices (11). An input device may be a tape recorder, or a disk drive, or other information storage means. Functioning of processing unit (12) is controlled by a program, a flow chart of which is shown in FIG. 2A.

Figure 2A:
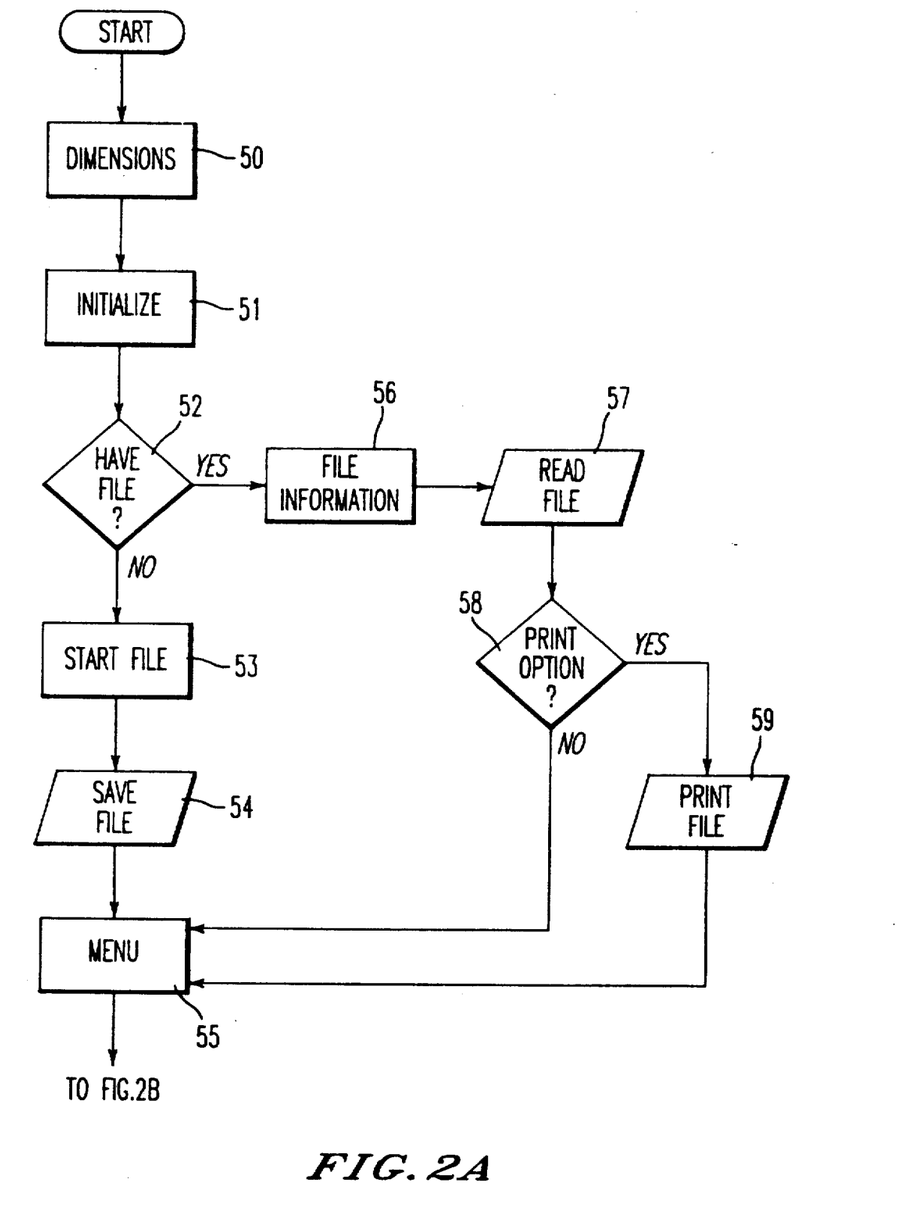
FIG. 2A and FIG. 2B are portions of a schematic flow chart of a program which controls functioning of a processing unit according to methodology of the present invention.

Beginning at top of FIG. 2A the program starts with declaring in functional block 50 the dimensions of variables used in the program. Variables are then initialized in the next functional block 51, after which control over data processing is transferred to decision block 52, which inquires whether a parent file exists. A "NO" output brings to functional block 53, where a file starts and then is saved on a magnetic storage device in functional block 54, arriving subsequently at a program menu (functional block 55).

A "YES" output of a "HAVE FILE ?" decision block 52 transfers control to functional block 56, which inquires information about the parent file, said file containing collection of informational words. The parent file is read in functional block 57.

A parent collection of informational words may be like the following one, which represents the first 7 lines of said collection:

| 950 | 100 | 1 | 50 | 101 | 0 |
| 70 | 101 | 1 | 250 | 102 | 0 |
| 275 | 102 | 1 | 1000 | 103 | 0 |
| 1005 | 103 | 1 | 1100 | 104 | 0 |
| 1010 | 103 | 2 | 1200 | 105 | 0 |
| 1015 | 103 | 3 | 1300 | 106 | 0 |
| 1020 | 103 | 4 | 1400 | 107 | 0 |

All data of this collection represent logical links between different individually numbered portions of a computer program. For illustrative purposes we will consider an example of a portion of a computer program performing bookkeeping and accounting functions, according to the principles of the U.S. Pat. No. 4,642,767 granted to me on Feb. 10, 1987.

The first three data (950 100 1) of said collection describe a port of a portion of said computer program, said port having number 1, which indicates that the port is exit 1, said exit being located on program line number 950, and said portion of the program having number 100 which indicates that it belongs to logical part 100. The following three numbers (50 101 0) describe a port of another portion of said computer program, said port having number (0) which indicates that it is an entrance of a part, said entrance located on program line 50, and said portion of program being identified as the logical part 101. All six first numbers form an informational word. The first word in this collection is remembered as number 1 informational word. Said word describes the transfer of control of data processing activity from exit 1 of logical part 100 to logical part 101.

The second set of six numbers (70 101 1 250 102 0) form informational word 2, which describes the transfer of control of data processing activity from exit 1 of logical part 101 to logical part 102.

Each logical part of said parent collection should, besides its number, be additionally identified by a name, preferably in abbreviated form, which describes at least one function of said logical part. For instance, logical part 100 performs a function of specifying dimensions of variables used in the program. Said logical part is therefore additionally identified by a name DIMENS (abbreviation for DIMENSIONS) which, for instance, follows the number of a port of said logical part. Logical part 101 performs a function of initializing (zeroing) variables. Said logical part is additionally identified by a name INITIAL (abbreviation for INITIALIZING). In this case the collection of informational words will become the following one, in which other logical part names are also indicated:

| 950 | 100 | 1 | DIMENS | 50 | 101 | 0 | INITIAL |
| 70 | 101 | 1 | INITIAL | 250 | 102 | 0 | MODE MENU |
| 275 | 102 | 1 | MODE MENU | 1000 | 103 | 0 | SELECTOR |
| 1005 | 103 | 1 | SELECTOR | 1100 | 104 | 0 | UPDATING |
| 1010 | 103 | 2 | SELECTOR | 1200 | 105 | 0 | LISTING |
| 1015 | 103 | 3 | SELECTOR | 1300 | 106 | 0 | COPYING |
| 1020 | 103 | 4 | SELECTOR | 1400 | 107 | 0 | STARTING |

In another embodiment of this invention each name is identified by a number by which it is listed in the library of names describing function of logical parts. In this case a collection of informational words would consist of numbers only.

Logical parts described by the above-mentioned collection of informational words are distinguished by a feature, that neither one of them returns control of data processing with the help of a RETURN-like command. A logical part of this type is called a "non-routine" logical part. Non-routine logical parts are identified here by numbers starting from 100 and up to 499.

A computer program can contain a logical part, characterized by a feature that said logical part eventually returns control of a data processing action back to a line following a particular exit of another logical part wherefrom this control was transferred to said logical part. Said logical part is called here a SUBROUTINE. Subroutines are identified here by numbers starting from 500 and up. An informational word containing a subroutine looks like the following one:

| 1115 | 104 | 1 | UPDATING | 1500 | 500 | 0 | PARENT INF |

This informational word stands for the following statement: exit (output) 1, located on program line 1115, transfers control of data processing action from logical part 104, named UPDATING to subroutine 500, named PARENT INF (INFORMATION) through entrance 0, located on the program line 1500, and, after performing a data processing action, control is transferred back to a line following exit 1 of the part 104. Ordinarily said return of control is performed in high-level computer languages by a command RETURN, coupled with initial transfer of control to a subroutine by a command GOSUB, CALL, etc.

FIG. 1 illustrates another principle of the present invention. All informational words, which were entered as a parent collection and stored in an operating memory of processing unit (12), can then be printed out with the help of a special algorithm of the processing unit (12) and of the output device (15) to obtain a hardcopy of the collection of informational words in a consecutive order of their location in the memory. This algorithm is reflected in a flow chart of FIG. 2A with decision block 58, called PRINT OPTION. A "YES" output of this block brings to functional block 59, performing a file printout function. Said printout we will call here DOCUMENT 1 and it can be as the following one:

organized in different sequences and combinations in such a manner that a set of printouts can describe logical structure of a computer program so, that this description substitutes a conventional graphical description of logical structure, like flow-charts, data-flow, etc. In order to obtain said set of printouts the processing unit (12) has an algorithm for performing a search of informational words by a particular attribute. In this way a hardcopy printout of all informational words can be done in a consecutive order of exit numbers of a logical part. This algorithm is reflected in a flowchart of FIG. 2B with decision block 60, called PRINT PART. A "YES" output of this block brings to functional block 61, where information about range of part numbers is entered. Control is then transferred to a group of functional blocks, which perform a search of all informa-

| DOCUMENT 1 | | | | | | | | |
|---|---|---|---|---|---|---|---|---|
| Program line | Unit/ SUB | Exit/ Entr | Name | Program line | Unit/ Sub | Exit/ Entr | Name | Memory # |
| 950 | 100 | 1 | DIMENS | 50 | 101 | 0 | INITIAL | 1 |
| 70 | 101 | 1 | INITIAL | 250 | 102 | 0 | MODE MENU | 2 |
| 275 | 102 | 1 | MODE MENU | 1000 | 103 | 0 | SELECTOR | 3 |
| 1005 | 103 | 1 | SELECTOR | 1100 | 104 | 0 | UPDATING | 4 |
| 1010 | 103 | 2 | SELECTOR | 1200 | 105 | 0 | LISTING | 5 |
| 1015 | 103 | 3 | SELECTOR | 1300 | 106 | 0 | COPYING | 6 |
| 1020 | 103 | 4 | SELECTOR | 1400 | 107 | 0 | STARTING | 7 |
| 900 | 100 | 0 | DIMENS | 5 | 115 | 1 | RUN | 8 |
| 1115 | 104 | 1 | UPDATING | 1500 | 500 | 0 | PARENT INF | 9 |
| 1120 | 104 | 2 | UPDATING | 9110 | 550 | 0 | PRINT INF | 10 |
| 1130 | 104 | 3 | UPDATING | 3000 | 501 | 0 | READ PARENT | 11 |
| 1140 | 104 | 4 | UPDATING | 1600 | 108 | 0 | DAUGTR FILE | 12 |

As it can be seen from this illustration, each informational word is characterized by a number of its location in the computer memory, said number being called here a MEMORY NUMBER. Memory number is an additional attribute of an informational word, which, however, is virtual belonging to this particular collection. All other attributes of an informational word, such as a logical part number, a port number, a line number of the port, and a part name, do not depend on location of a particular informational word in a collection. Said particular word can occupy different locations in the collection before and after amendment of this word.

As it can also be seen from DOCUMENT 1, an informational word does not necessarily starts with attributes of a logical part wherefrom control of data processing action is transferred—a first four attributes can belong to the logical part to which control is transferred, as in the case of an informational word having memory #8.

FIG. 1 illustrates the third principle of the invention, that is, providing hardcopies of informational words, tional words in order to find those words which contain a particular part number M (see functional blocks 62, 63), then create an array which contains all informational words having part M (see functional blocks 64, 65, and 66). After the array is created, the decision block 66 transfers control through a "YES" output to a group of functional blocks 67 to 71, printing out informational words in a consecutive order of exit numbers of part M, starting with exit 1 (see functional block 69). Control now is transferred through a "YES" output of decision block 71 to decision block 72, which either transfers control to functional block 62, in order to make a printout of all informational words, containing a logical part with the next part number, said informational words being arranged in a consecutive order of the exit numbers of said part. Or, when printing out of all parts is over, decision block 72 transfers control back to MENU (functional block 55 in FIG. 2A). This printout is called here DOCUMENT 2 and can be as the following one:

| DOCUMENT 2 | | | | | | | | |
|---|---|---|---|---|---|---|---|---|
| Program line | Unit/ SUB | Exit/ Entr | Name | Program line | Unit/ Sub | Exit/ Entr | Name | Memory # |
| 900 | 100 | 0 | DIMENS | 5 | 115 | 1 | RUN | 8 |
| 950 | 100 | 7 | DIMENS | 50 | 101 | 0 | INITIAL | 1 |
| 50 | 101 | 0 | INITIAL | 950 | 100 | 1 | DIMENS | 1 |
| 70 | 101 | 1 | INITIAL | 250 | 102 | 0 | MODE MENU | 2 |
| 250 | 102 | 0 | MODE MENU | 70 | 101 | 1 | INITIAL | 2 |
| 275 | 102 | 1 | MODE MENU | 1000 | 103 | 0 | SELECTOR | 3 |
| 1000 | 103 | 0 | SELECTOR | 275 | 102 | 1 | MODE MENU | 3 |
| 1005 | 103 | 1 | SELECTOR | 1100 | 104 | 0 | UPDATING | 4 |
| 1010 | 103 | 2 | SELECTOR | 1200 | 105 | 0 | LISTING | 5 |
| 1015 | 103 | 3 | SELECTOR | 1300 | 106 | 0 | COPYING | 6 |
| 1020 | 103 | 4 | SELECTOR | 1400 | 107 | 0 | STARTING | 7 |
| 1100 | 104 | 0 | UPDATING | 1005 | 103 | 1 | SELECTOR | 4 |
| 1115 | 104 | 1 | UPDATING | 1500 | 500 | 0 | PARENT INF | 9 |

DOCUMENT 2

| Program line | Unit/ SUB | Exit/ Entr | Name | Program line | Unit/ Sub | Exit/ Entr | Name | Memory # |
|---|---|---|---|---|---|---|---|---|
| 1120 | 104 | 2 | UPDATING | 9110 | 550 | 0 | PRINT INF | 10 |
| 1130 | 104 | 3 | UPDATING | 3000 | 501 | 0 | READ PRNT FILE | 11 |
| 1140 | 104 | 4 | UPDATING | 1600 | 108 | 0 | DAUGHTER FILE | 12 |

As it can be seen from this illustration, Document 2 provides a comprehensive description of all links within a program for each particular non-routing logical part.

Another hardcopy printout of informational words in a consecutive order of subroutine numbers is called "DOCUMENT 3" and it can be as the following one:

DOCUMENT 3

| Program line | Unit/ SUB | Exit/ Entr | Name | Program line | Unit/ Sub | Exit/ Entr | Name | Memory # |
|---|---|---|---|---|---|---|---|---|
| 1500 | 500 | 0 | PARENT INF | 1115 | 104 | 1 | UPDATING | 9 |
| 3000 | 501 | 0 | READ PRNT FILE | 1130 | 104 | 3 | UPDATING | 11 |
| 3000 | 501 | 0 | READ PRNT FILE | 95 | 136 | 3 | CREATE REF | 266 |
| 3000 | 501 | 0 | READ PRNT FILE | 2715 | 528 | 4 | READ LISTING | 415 |

Document 3, as it can be seen from this illustration provides a logical parts environment for each particular subroutine showing all links with any other parts of the computer program.

Document 2 and 3 essentially constitute a set of hardcopy printouts which has the power of substituting conventional graphical description of the logical structure such as the flow-chart, data-flow, etc. It is convenient, however, to complement this set with an additional printout of informational words organized in consecutive order of line numbers of entrances of logical parts. This type of printout is controlled by a group of functional blocks 73 to 79 in FIG. 2C. In particular, when the decision block 73 transfers control to functional block 79, information about the range of program lines is entered. A search of all informational words begins with block 75 and an informational word with a consecutive line number is printed out in functional block 78 with the help of a nested loop, created by blocks 75, 76, 77, and 79. This printout is called here Document 4 and it can be as the following one:

a portion of the program, belongs to. While DOCUMENTS 2 and 3 provide the route "from logical structure to computer program", the DOCUMENT 4 provides the opposite route "from computer program to logical structure". It is possible, instead, or in addition to DOCUMENT 4, to use a program line with a REMARK (REM) statement at the beginning of each logical part within the computer program, said statement containing the number and, optionally, the name of the logical part. This way however, can not be used whenever the programmer is concerned with nondisclosure of the logical structure of the program to an unauthorized eye.

A set of DOCUMENTS 2,3 and 4 printed out in a scroll form in combination with a scroll printout of the computer program corresponding to said set, constitutes a comprehensive means for easy reading and understanding the program irrespective to its size and complexity.

In another embodiment of the invention, the machine of FIG. 1 provides a "loose-leaf" organization of the set of DOCUMENTS 2 and 3. In said organization the informational words belonging to a particular logical part are printed out on at least one separate page, or pages, immediately followed by the printout of the portion of the program belonging to said particular logical part. The example below illustrates said type of

DOCUMENT 4

| Program line | Unit/ SUB | Exit/ Entr | Name | Program line | Unit/ Sub | Exit/ Entr | Name | Memory # |
|---|---|---|---|---|---|---|---|---|
| 50 | 101 | 0 | INITIAL | 1600 | 100 | 1 | DIMENS | 1 |
| 250 | 102 | 0 | MODE MENU | 70 | 101 | 1 | INITIAL | 2 |
| 900 | 100 | 0 | DIMENS | 5 | 115 | 1 | RUN | 8 |
| 1000 | 103 | 0 | SELECTOR | 275 | 102 | 1 | MODE MENU | 3 |
| 1100 | 104 | 0 | UPDATING | 1005 | 103 | 1 | SELECTOR | 4 |
| 1200 | 105 | 0 | LISTING | 1010 | 103 | 2 | SELECTOR | 5 |
| 1300 | 106 | 0 | COPYING | 1015 | 103 | 3 | SELECTOR | 6 |
| 1400 | 107 | 0 | STARTING | 1020 | 103 | 4 | SELECTOR | 7 |
| 1500 | 500 | 0 | PARENT INF | 1115 | 104 | 1 | UPDATING | 9 |
| 1600 | 108 | 0 | DAUGHTER FILE | 1140 | 104 | 4 | UPDATING | 12 |

Document 4 is helpful whenever there is a need to identify, which logical part a particular program line, or organization for the considered above bookkeeping and accounting program.

| Program line | Unit/ SUB | Exit/ Entr | Name | Program line | Unit/ Sub | Exit/ Entr | Name | Memory # |
|---|---|---|---|---|---|---|---|---|
| 1000 | 103 | 0 | SELECTOR | 275 | 102 | 1 | MODE MENU | 3 |
| 1005 | 103 | 1 | SELECTOR | 1100 | 104 | 0 | UPDATING | 4 |
| 1010 | 103 | 2 | SELECTOR | 1200 | 105 | 0 | LISTING | 5 |

-continued

| 1015 | 103 | 3 | SELECTOR | 1300 | 106 | 0 | COPYING | 6 |
|---|---|---|---|---|---|---|---|---|
| 1020 | 103 | 4 | SELECTOR | 1400 | 107 | 0 | STARTING | 7 |
| | | | 1000 REM *** 103 SELECTOR *** | | | | | |
| | | | 1005 IF K = 1 GOTO 1100 | | | | | |
| | | | 1010 IF K = 2 GOTO 1200 | | | | | |
| | | | 1015 IF K = 3 GOTO 1300 | | | | | |
| | | | 1020 IF K = 4 GOTO 1400 | | | | | |

The printout of the portion of the program in this illustration can be performed automatically if the collection of informational words is incorporated into the program, which the collection describes. Or it can be done manually by cutting the hardcopy printout of the computer program into portions, each portion starting with the entrance (input) of the logical part and ending at the last exit (output) of said logical part, or the last RETURN command, if said logical part is a subroutine.

The invented machine and method allow to easily read and understand the program using numerical description of its structure with the help of a set of DOCUMENTS 2,3 and 4. The invention allows also to easily modify the program and its structure, providing a concise and comprehensive description of modifications.

Whenever a portion of a program is modified to the extent that said modification effects the logical structure of a particular logical part, to which said portion of the program belongs, the logical environment of said particular logical part is described with the help of a program map, created from DOCUMENTS 2 and 3.

Suppose for instance, that the portion of the program, which belongs to the logical part 103, is the one shown in the above illustration of the loose-leaf organization of DOCUMENT 3. Suppose we modify said portion of the program to include an additional exit on the line 1017 transferring the control of data processing action to another part (having number 125 and named JOURNAL SEARCH) through its entrance located on the program line 2620.

| PROGRAM | PROGRAM AMENDMENT |
|---|---|
| 1000 REM *** 103 SELECTOR *** | |
| 1005 IF K = 1 GOTO 1100 | |
| 1010 IF K = 2 GOTO 1200 | |
| 1015 IF K = 3 GOTO 1300 | |
| 1020 IF K = 4 GOTO 1400 | |
| enter: | 1017 IF K = 5 GOTO 2620 |

Figure 3:
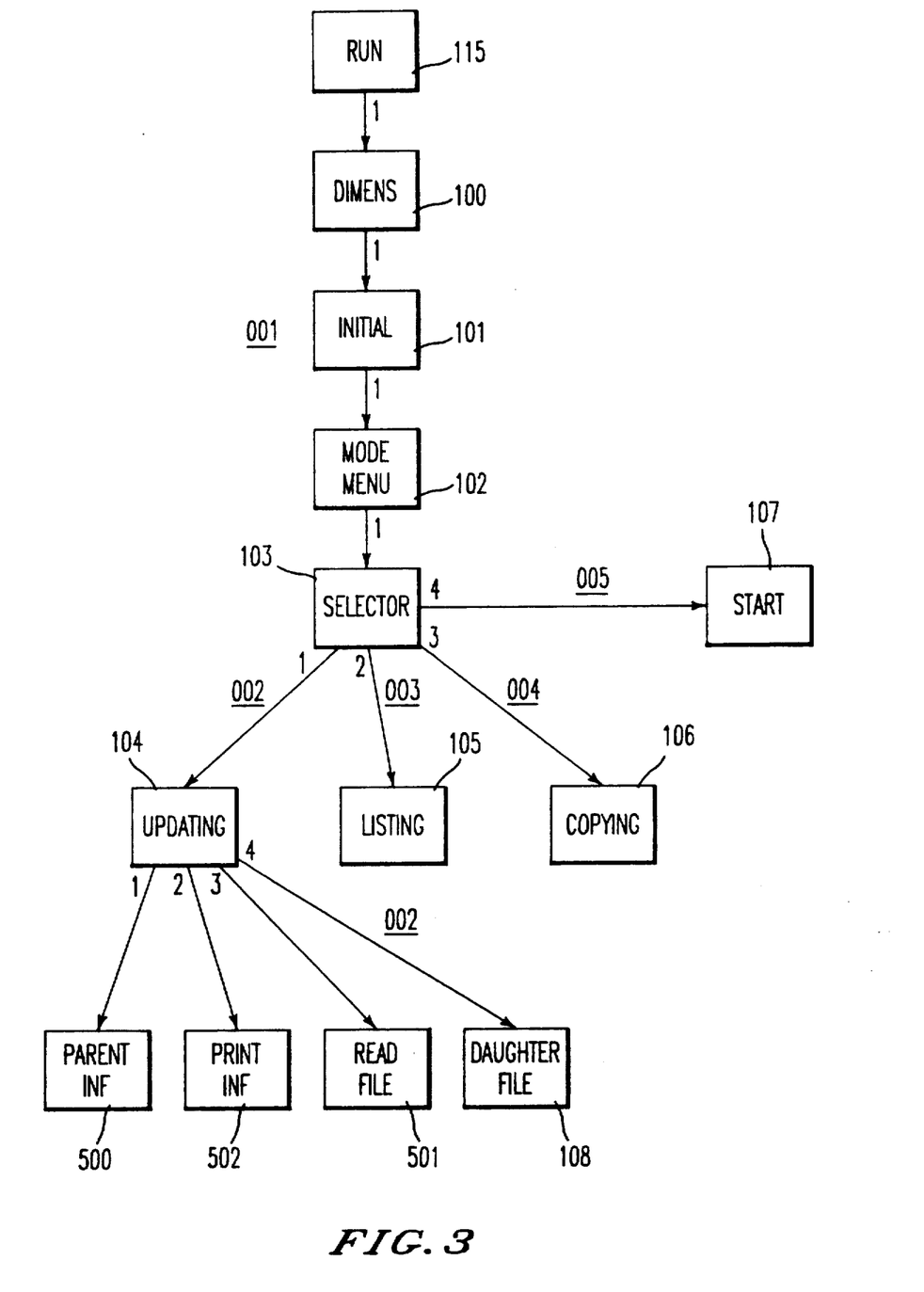
FIG. 3 is a control flow diagram created from the immediate environments of non-routine logical parts.

In order to identify amendments which should be introduced into the logical structure, and into the program, a program map graphically describing the logical environment of part 103 is created in the preferred embodiment of this invention. The program map of the logical part 103 showing logical links and identifying their amendments is illustrated in FIG. 3. The program map of FIG. 3 was created from the information gathered in DOCUMENT 2: the number of each logical part is indicated in a separate rectangular block, the link of a particular logical part with another logical part is shown with the help of a line issuing from a particular exit of said part; the number of said exit and the program line number of said exit are shown preferably over the line close to the point of issuance of the line; said line ending at the entrance of a linking logical part, the program line number of said entrance being indicated over the line, the name of said other logical part being indicated along and under the line. Each block contains the number of logical part and through a dash the number of the informational word in the collection. The block of logical part 103, for which the logical map is created, may not contain a specific memory number. It may include, however, the name of the part in the block in order to distinguish this central part from all the others.

When a program map describing the status of the structure of the program before amendment is drawn, the amendment is indicated by a new line which describes a new exit 4 located on the program line 1017 preceding the former exit 4 on the line 1020. It means that two amendments should be introduced into the present collection of informational words. The first one adds a new informational word to the collection, said word describing the transfer of control from the exit on the program line 1017, which is the new exit 4 of part 103 to the entrance of the logical part 125. The new informational word will have therefore the following format:

| 1017 | 103 | 4 | 2620 | 125 | 0 | JOURNAL SEARCH. |
|---|---|---|---|---|---|---|

The second amendment changes the exit number from 4 to 5 in the informational word which describes the link between logical parts 103 and 107 before the amendment. As it follows from DOCUMENT 2 and as it is shown in the block of part 107 the number of said informational word is 7.

These two amendments are identified on the program map of FIG. 3 with the help of arrows, showing the type of the amendment: CREATE—for part 125, AMEND—for part 107. In case any link was deleted during amendment the word DELETE is indicated inside the arrow. If an informational word is amended it is also preferred to indicate close to, or within, the arrow the specific attribute of the word which should be changed (exit 4 to 5 in the considered case).

The amendments graphically indicate on the program map with the help of arrows are also described in the following preferred form:

| ACTION | MEM # | UNIT/SUB | DESCRIPTION OF AMENDMENT | | | | REMARK |
|---|---|---|---|---|---|---|---|
| CREATE | | 125 | 1017 | 103 | 4 | SELECTOR | |
| | | | 2620 | 125 | 0 | JOURNAL SEARCH | |
| AMEND | | | | | | | |
| DELETE | | | | | | | |
| CREATE | 7 | 107 | 4→5 | | | | |
| AMEND | | | | | | | |

| ACTION | MEM # | UNIT/SUB | DESCRIPTION OF AMENDMENT | REMARK |
|---|---|---|---|---|
| DELETE | | | | |

When the program map, graphically describing the logical environment of a particular logical part before and after amendments, is combined with the portion of the amended program, and with the description of the amendment to be entered into the machine, then a new document is created. We will call said document here as WORKING DOCUMENT.

FIG. 1 illustrates still another principle of the present invention. The machine for designing the logical structure of a computer program has an additional input device (14), a key board, for example, through which the attributes of the amended informational words (13) are entered into the processing unit (12). Said processing unit has an algorithm of performing a search of informational words of the parent collection, in order to find and print out on the screen, with the help of the output device (20), all informational words, containing the same numbers of the logical part as the particular one, which is entered as an attribute of the amendment. The program, which controls processing unit, has a structure very close to the one used to get a printout of Documents 2 and 3 (see FIG. 2B). It is the kind of printout which is different; here we consider a screen printout, whereas Documents 2 and 3 are hardcopy printouts. Said printout of informational words helps the designer to verify whether a particular amendment has already been entered into the machine. In order to enter the amendment, said processing unit does the search of informational words finding that particular one which is subject to change. Said particular informational word is printed out with the help of the output device (15). Following the printout, said informational word is substituted in the collection with the amended one, and said amended informational word is also printed out with the help of the output device (15) (see also functional blocks 73-80 in FIG. 2D). The number of the informational word to be amended is inquired in functional block 74. This word is printed out in block 76, after the file is read in block 75. Then said word is amended to block 79 and printed out in block 80. The hardcopy printout of the amended informational words before and after amendment, as well as of the new informational words added to the parent collection, is important as a document describing the history of the logical structure. Said document is called here DOCUMENT 5.

According to another principle of the invention illustrated in FIG. 1 the new daughter collection of informational words, which is created after all amendments are entered into the parent collection, is saved by said processing unit (12) of the machine with the help of the output device (17) in a memory storage device including magnetic tape, disk, etc. In the flow chart of FIG. 2D the saving operation is described by a decision block 81, which transfers control to functional block 82, where the first line of the collection of informational words is filled with the requirements of the file (file number, date, etc.). Control then is transferred to functional block 83, where the daughter file is saved. Said daughter collection of informational words is used to create a new set of hard copy printouts of informational words in numerical order of 1) logical units, 2) subroutines, and 3) program line numbers identifying the entrances of logical parts, said printouts called new DOCUMENTS 2, 3 and 4, and being used to describe the new logical structure of the computer program. The old DOCUMENTS 2, 3 and 4 of the parent collection describing the previous logical structure can now be disposed of, since the previous structure becomes obsolete.

The history of the development of the logical structure is however preserved in the DOCUMENTS 1 and 5 in combination with WORKING DOCUMENTS. Any parent or grandparent set of disposed DOCUMENTS 2, 3 and 4 can, however, be always restored from the corresponding collections saved in a memory storage devices.

Returning now to FIG. 4 there are shown schematically elements of one embodiment of the invented system for designing the logical structure of a computer program, based on Commodore TM computer having the memory size at least 16 kilobytes. In this figure, 1 is the Commodore computer VIC-20 with 16 kilobytes Random Excess Memory, 2—cathode ray tube (CRT), which can be either monitor or TV-set, 3—tape recorder, 4—disk drive, 5—printer.

Small operating memory requirement for the system irrespective to the size of the collection of informational words is based on another principle of the present invention. The machine keeps in its operating memory a batch of informational words, containing at least one informational word which was currently created or amended. Said batch is then saved in the memory storage device, being retrieved from the operating memory. Said batch is then entered back into the operating memory during the process of search. The number of informational words in the batch depends on the size of operating memory. The whole collection of informational words becomes therefore a sequence of batches, the number of which depending on the size of the collection rather than on the size of operating memory of the computer.

Any other computer having an operating memory size higher than 16 kilobytes can be also implemented for the invented machine for designing the logical structure of a computer program. Batch size organization of the collection of informational portion of computer memory leaving the rest of it to be used for other purposes.

FIG. 5 shows an example of implementation of a batch concept to the program controlling the processing unit. The batch variation of the functional block 57 in FIG. 2A consists of a similar functional block 57 in FIG. 3, which reads the first batch. Control is then transferred to the next functional block 84 where the contents of the first line of the collection is remembered. The line contains file requisites (file number, date, etc.), which are printed out in the functional block 85 in order to supply the verification information to the operator. At the next step (functional block 86) an additional informational file is read. This file contains requisites of the system of batches (total number of batches, number of words in each batch, etc.). Then the operational files, exceeding the number of batches by one, are created in functional blocks 87 and 88. Operational files are loaded with all the batches and are used during the session.

When a daughter file is created, the operational files become the source of creation daughter batch files.

Referring now to FIG. 6, it shows how a data flow diagram can be drawn using, as a source of information, the immediate parent environment of non-routine logical parts. The data flow diagram starts with the first portion of the program, which is logical unit 115, called RUN. Part 115 transfers control to unit 100 DIMENSIONS (see immediate environment of part 100 in DOCUMENT 2).

Part 100 transfers control to logical part 101 INITIALIZE. Then control is transferred from part 101 to part 102 MODE MENU. Considering in the same manner each link consecutively, and drawing a diagram, we will eventually arrive at a data flow diagram of FIG. 3.

According to one of the principles of this invention, a collection of informational words can be used for creating a data flow in a textual, rather than in a graphical form. We will divide for this purpose the graphical data flow diagram of FIG. 3 into five linear data flow diagrams. A LINEAR DATA FLOW diagram (or LDF) is a linear combination of at least three non-routine logical parts, which successively transfer control over data processing from one to another.

An LDF starts from a non-routine logical part at the beginning of a program or at a BRANCHING part, which is a non-routine logical part, wherefrom at least two independent LDFs start. An LDF ends at a last non-routine part, which is a part at the end of a program, or a branching part, or a non-routine logical part which already belongs to another LDF, said part being called a ROOTING part.

The first LDF of FIG. 3, which has number 001, starts from part 115 and continues through parts 100, 101 and 102 until it reaches logical part 103, which is a branching part, having several exits to other non-routine parts. Several LDFs (002, 003, 004 and 005) start from these exits.

LDF 002 starts from exit 1 of part 103 and continues to part 108 through non-routine part 104 and subroutines 500, 502 and 501.

Three other LDFs (003, 004 and 005) are represented only by two parts correspondingly: parts 103 and 105 for LDF 003, parts 103 and 106 for LDF 004 and so on.

It was indicated above that an LDF should be represented by at least three non-routine logical parts, however each of LDFs 003, 004 and 005 only two parts. It is assumed here that each of said LDFs actually has following non-routine parts not shown here. Therefore each of them is considered to be an LDF.

According to this invention the LDF numbers declared in the process of drawing data flow diagrams from the immediate environment of non-routine logical parts (DOCUMENT 2) are incorporated into pertinent informational words of DOCUMENT 1. This incorporation is done either by introducing an additional field into an informational word, or by using an existing field, for instance, by preceding with an LDF number a name of a logical part in a name field (see DOCUMENT 1 with LDF numbers below).

| DOCUMENT 1 with LDFs | | | | | | | | |
|---|---|---|---|---|---|---|---|---|
| Program line | PART | Exit/Entr | Name | Program line | PART | Exit/Entr | Name | Memory # |
| 950 | 100 | 1 | 001 DIMENS | 50 | 101 | 0 | 001 INITIAL | 1 |
| 70 | 101 | 1 | 001 INITIAL | 250 | 102 | 0 | 001 MODE MENU | 2 |
| 275 | 102 | 1 | 001 MODE MENU | 1000 | 103 | 0 | 001 SELECTOR | 3 |
| 1005 | 103 | 1 | 002 SELECTOR | 1100 | 104 | 0 | 002 UPDATING | 4 |
| 1010 | 103 | 2 | 003 SELECTOR | 1200 | 105 | 0 | 003 LISTING | 5 |
| 1015 | 103 | 3 | 004 SELECTOR | 1300 | 106 | 0 | 004 COPYING | 6 |
| 1020 | 103 | 4 | 005 SELECTOR | 1400 | 107 | 0 | 005 STARTING | 7 |
| 900 | 100 | 0 | 001 DIMENS | 5 | 115 | 1 | 001 RUN | 8 |
| 1115 | 104 | 1 | UPDATING | 1500 | 500 | 0 | PARENT INF | 9 |
| 1120 | 104 | 2 | UPDATING | 9110 | 550 | 0 | PRINT INF | 10 |
| 1130 | 104 | 3 | UPDATING | 3000 | 501 | 0 | READ PARENT | 11 |
| 1140 | 104 | 4 | 002 UPDATING | 1600 | 108 | 0 | 002 DAUGTR FILE | 12 |

It can be seen from this document, that not all informational words have LDF numbers incorporated into names of these words. All words, containing subroutines (which are logical parts with numbers starting from 500 and up), do not have a reference to any particular LDF. This happened because the same subroutine can belong to many LDFs, whereas each non-routine logical part, except branching and rooting ones, belong to only one LDF.

A declaration of an LDF number and incorporation of it into a collection of informational words is not enough for providing an LDF printout with the help of processing unit (12) in FIG. 1. A non-routine logical part, from which an LDF starts, should be declared as well. A last part where an LDF ends is also required. In our case LDF 001 starts at part 115 and ends at part 103. LDF 002 starts at part 103 and ends at part 108, etc.

FIG. 1 illustrates another principle of this invention, that is, providing hard copies of informational words, organized in such a manner, that a succession of logical parts in the printout hard copy actually corresponds to a succession of logical parts in a linear data flow diagram.

In order to obtain an LDF in the form of a hard copy printout, parent collection (10) of informational words is entered into processing unit (12) through one of input devices (11). Processing part (12) has an algorithm for performing search of informational words by LDF number and arranging said words in a succession as they follow each other in a LDF.

Figure 2B:
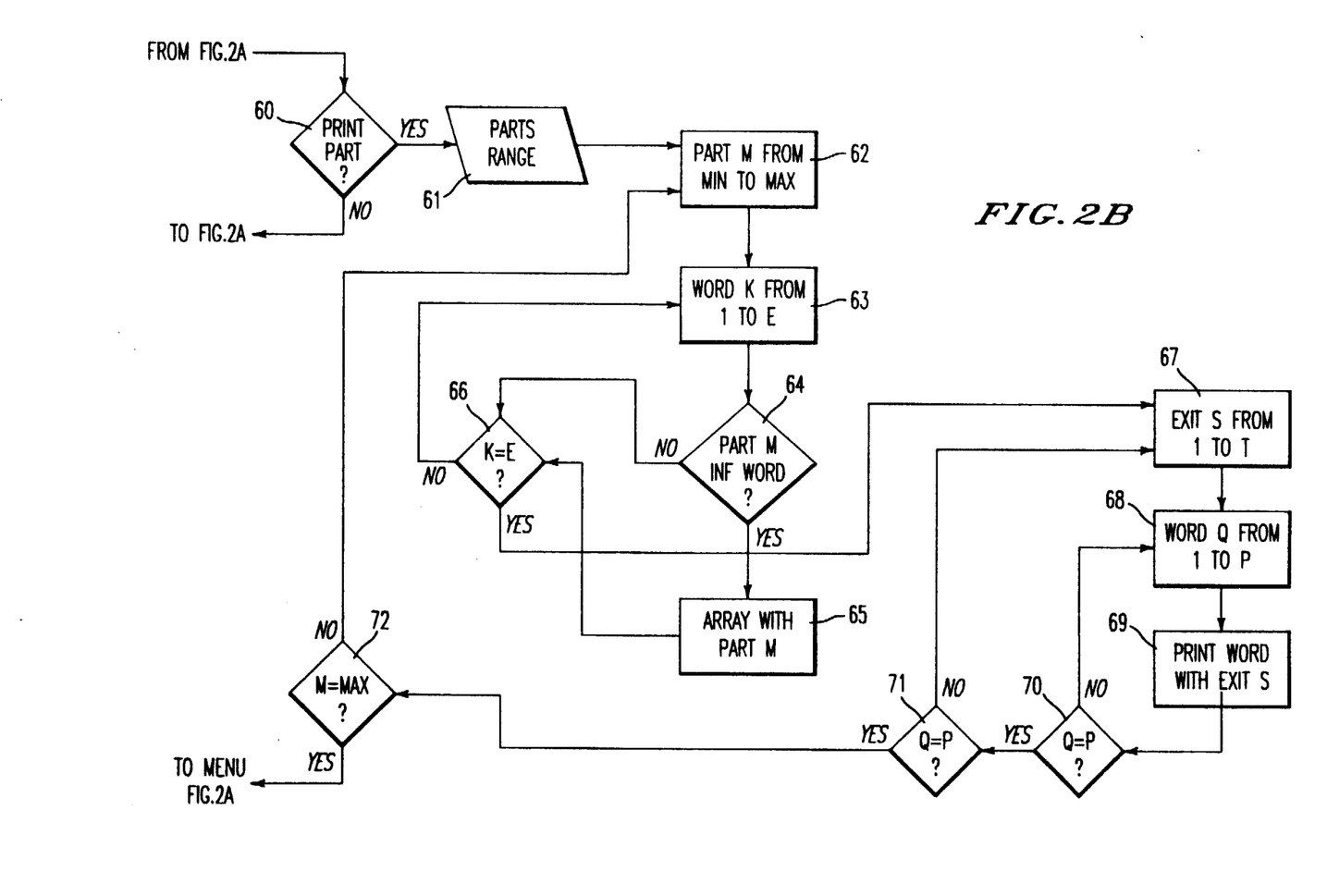

This algorithm may be similar to one already illustrated by a flow chart of FIG. 2B and used for printing out informational words in a consecutive order of exit numbers of a logical part. In the case of LDF printout, informational words are printed out in a succession in which non-routine logical parts follow each other in a data flow. This succession is indicated by a LDF number incorporated into related informational words. Therefore, when a search begins with a non-routine logical part, from which a particular LDF starts, an informational word, containing said part and said LDF number, is printed out. Concurrently same informational word identifies a "following" part, belonging to said LDF, to which control of data processing action is transferred. The search is now repeated for said following part providing a subsequent printout. This process continues until a last part, belonging to said LDF is reached.

In another embodiment of this invention a more detailed linear data flow diagram is printed out, this LDF containing all informational words related to this LDF. All subroutines involved in a data flow are printed out in this embodiment. Information about other LDFs starting from other exits of involved branching parts is also printed out in this embodiment.

Figure 4:
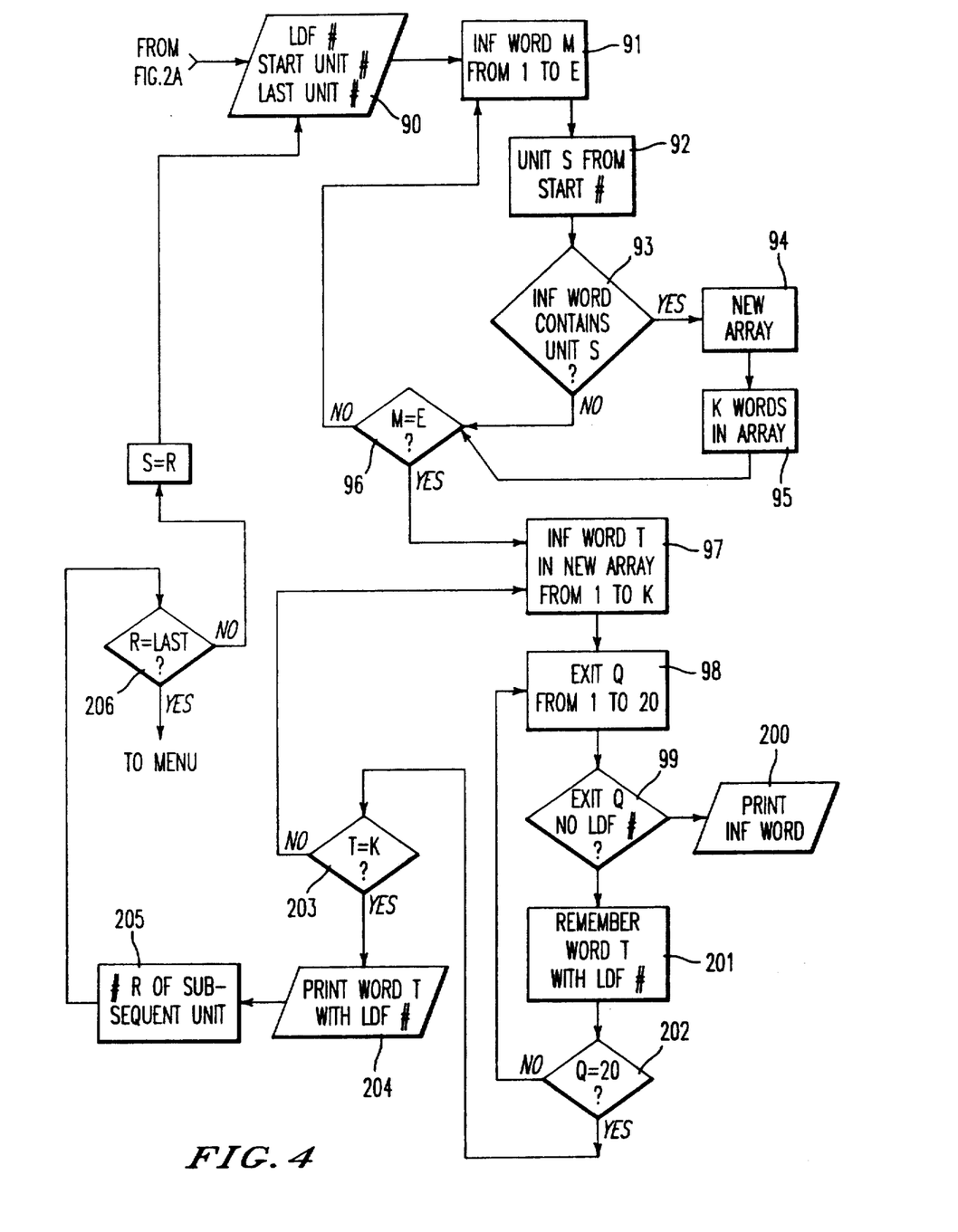
FIG. 4 is a schematic flow chart of a program, which controls processing unit during the LDF printout option.

An algorithm, which controls a processing part, which prints out LDFs, is described in a flow chart of FIG. 4. Data processing starts here from the top of the flow chart with functional block 90, where an information about LDF (a number and a name of LDF, a number of a starting logical part, a number of a last logical part) is inquired and entered. This information is then printed out in the caption of an LDF page.

A search of a collection of informational words is performed in functional blocks from 91 to 96 in order to create a new array containing only those informational words, which have non-routine logical parts, belonging to a given LDF. Number S of a logical part is controlled by functional block 92 and said number starts from the number of a starting part entered in block 90. Decision block 93 chooses informational words which contain S and sends them into a new array (functional block 94), which is filled, when decision block 96 transfers control to block 97 until all words of the collection were searched (M=E). When the new array fills up, number K of words in this array is found in functional block 95.

A search of words, belonging to the new array, starts in block 97. Words are printed out in functional block 99 in a succession of exit numbers of logical part S. This printout is controlled by decision block 98 which sends to block 99 only those words which do not contain the LDF number entered in block 90. These words are printed out in informational block 200.

A word, which contains said LDF number, is remembered in functional block 201. Control then is transferred to decision block 202, a "NO" output of which triggers a search by the next exit number. A "YES" output of block 202 sends control 10 decision block 203, which performs a search of the next informational word T, if the new array is not exhausted (T<K). When T=K, control is transferred to functional block 204, where the word, remembered in block 201, is printed out. Part number R, which is subsequent to non-routine part S, is determined in functional block 205, and if said number R is not the number of a last part of LDF, then control is transferred by decision block 205 to part 91, and the search starts for the part number S=R.

The process of printing out LDF is over when the next part with number R reaches the number of a last part, which was entered in functional block 90. Decision block 206 in this case sends control over data processing back to menu in FIG. 2A.

The following is an example of LDF printout which contains a succession of non-routine logical parts only:

| LDF 001 | | | | STARTING part 115: LAST part 103 | | | | |
|---|---|---|---|---|---|---|---|---|
| Program line | PART | Exit/ Entr | Name | Program line | PART | Exit/ Entr | Name | Memory # |
| 50 | 115 | 1 | 001 RUN | | | | | |
| 900 | 100 | 0 | 001 DIMENS | | | | | 8 |
| 950 | 100 | 1 | 001 DIMENS | | | | | |
| 50 | 101 | 0 | 001 INITIAL | | | | | 1 |
| 70 | 101 | 1 | 001 INITIAL | | | | | |
| 250 | 102 | 0 | 001 MODE MENU | | | | | 2 |
| 275 | 102 | 1 | 001 MODE MENU | | | | | |
| 1000 | 103 | 0 | 001 SELECTOR | | | | | 3 |

The following printout of LDF 002 illustrates another embodiment of this invention, where subroutines involved in a data flow are also printed out, providing a more detailed description of an LDF:

| LDF 002 | | | | STARTING part 103: LAST part 108 | | | | |
|---|---|---|---|---|---|---|---|---|
| Program line | PART | Exit/ Entr | Name | Program line | PART | Exit/ Entr | Name | Memory # |
| 1005 | 103 | 1 | 002 SELECTOR | | | | | |
| 1100 | 104 | 0 | 002 UPDATING | | | | | |
| 1115 | 104 | 1 | UPDATING | 1500 | 500 | 0 | PARENT INF | 9 |
| 1120 | 104 | 2 | UPDATING | 9110 | 530 | 0 | PRINT INF | 10 |
| 1130 | 104 | 3 | UPDATING | 3000 | 501 | 0 | READ PARENT | 11 |
| 1140 | 104 | 4 | 002 UPDATING | | | | | |
| 1600 | 108 | 0 | 002 DAUGTR FILE | | | | | 12 |

A comparison of these examples with FIG. 3 shows that a textual version of LDFs according to this invention supplies much more detailed information about data flow, than information about an LDF in a graphical form. An LDF in a textual form is very convenient for keeping a trace of changes in logical structure of a program.

What is claimed is:

1. A machine for describing a logical structure of a large computer program, the machine comprising
    a) an input device, connected to the machine, and capable of entering into a processing unit of the machine a collection of informational words, numerically describing links between routine and non-routine portions of the computer program, each portion being called a "logical part", each link representing a transfer of control of data processing action from an exit of one logical part to an entrance of another logical part; each informational word containing attributes of an exit of one logical part, which are a number and a name of a logical part, an exit number, and, optionally, a program line number of an exit, containing attributes of an entrance of a linked logical part, which are a number and a name of this logical part, an entrance number (0), and a label of an entrance line, containing attributes of a linear data flow (LDF), which are an LDF number, a starting LDF logical part, a last LDF logical part, and LDF name, the LDF attributes being specified only for those words, which link two non-routine logical parts, said collection of informational words being called a "parent collection";

b) said processing unit having an algorithm of memorizing the entered parent collection and performing a search of informational words by attributes of a logical part and by attributes of an LDF;

c) an output device, connected to the machine, and capable of providing a hard copy printout of informational words arranged in a consecutive order of non-routine logical parts which belong to a particular linear data flow.

2. A machine for describing a logical structure of a large computer program, the machine comprising a) an input device, connected to the machine, and capable of entering into a processing unit of the machine a collection of informational words, numerically describing links between different portions of the computer program, said portions being called "logical parts", each link representing a transfer of control of data processing action from an exit of one logical part to an entrance of another logical part; each informational word containing attributes of an exit of one logical part, which are a number and a name of a logical part, an exit number, and, optionally, a program line number of an exit, containing attributes of an entrance of a linked logical part, which are a number and a name of this logical part, an entrance number (0), and a label (number) of an entrance line, attributes of a linear data flow (LDF), which are an LDF number, a starting LDF logical part, a last LDF logical part, and LDF name, the LDF attributes being specified only in those words, which link two non-routine logical parts, said collection of informational words being called a "parent collection";

b) said processing unit having an algorithm of memorizing said entered parent collection, and performing a search of informational words by attributes of a logical part and by attributes of an LDF;

c) an output device, connected to the machine, and capable of providing a hard copy printout of informational words arranged in consecutive order of non-routine logical parts and subroutines logical parts which belong to a particular linear data flow.

3. A method, performed by a computer, for numerical description of a logical structure of a large computer program, the method comprising the steps of a) dissecting a computer program into formal logical parts, each part starting with an entrance line to which control is transferred from another logical part of the program, and each part ending at a line which precedes the entrance line of the following logical part, each part belonging to one of two classes: (1) class of subroutine logical parts which end with a RETURN-like command, and (2) class of non-routine parts which do not have a RETURN-like command;

b) next, declaring a name which defines a function of a logical part and therefore transforming a formal logical part into a functional logical part;

c) next, describing a link between two logical parts by an informational word which contains two addresses: (1) an address of an exit of one logical part, which is defined by a part number, a part name, an exit number, and, optionally, by a label of exit line, (2) an address of an entrance of a linked logical part, which is defined by a linked part number and name, by an entrance number, which is 0 (zero), and by a label of entrance line;

d) next, entering attributes of each informational word into a computer memory, creating a sequential collection of informational words, where each word is identified by an order number in said collection, said order number being called a "memory number";

e) next, conducting a computerized search for informational words, containing a particular logical part, printing out these words in a consecutive order of exit numbers of this particular part, this printout being called an "immediate environment";

f) next, creating a graph (map) of all linked non-routine logical parts, using as a source an immediate environment of each logical part, g) next, declaring from said graph a succession of at least three consecutive non-routine logical parts, said succession starting from a part in the beginning of a program and ending at the end of the program, this succession being called a linear data flow diagram (LDF), and being identified by LDF requisites, which include a LDF number, a starting LDF part, a last LDF part;

h) next, declaring all subsequent LDFs, each LDF starting from a branching logical part, which already belongs to a declared LDF, and ending at a last LDF part, to which belongs a part ending a program, a branching part from which at least two separate LDFs start, a rooting part, at the entrance of which several LDFs meet;

i) next, assigning a name to each LDF, which describes LDF function;

j) next, amending all informational words, which describe links between non-routine logical parts, to include a number of LDF, to which a logical part belongs, whereby creating a new collection of informational words, describing both logical parts and LDFs.

4. A method according to claim 3, further comprising the steps of k) next, performing a computerized search of said new collection of informational words for a word which contains an exit of a non-routine logical part, from which a particular LDF starts, this word identifying an entrance of a non-routine logical part referred thereafter as a "following" part, which is linked to a starting part, then printing out a portion of this word, containing an address of the exit of the starting part, on one line, and printing out another portion of this word containing an address of the entrance of the linked "following" part on another line;

l) next, searching for an informational word, which contains an exit of the "following" part, belonging to said particular LDF, then printing out a portion of this word, containing an address of the exit of the "following" part, on one line, and printing out another portion of this word, containing an address of an entrance of a next linked "following" part, on another line;

m) repeating this search until a last logical part, at which LDF stops, is reached, whereby a linear data flow containing all related non-routine parts is printed out.

5. A method according to claim 3, further comprising the steps of k) next, performing a computerized search of said collection of informational words for words, which contain all exits of a non-routine logical part wherefrom a particular LDF starts, then printing out these words in a consecutive order of exit numbers, provided that a word with an exit, which belongs to said particular LDF, is being printed last, this word identifying an entrance of a non-routine logical part (referred thereafter as a "following" part) which is linked to a starting part, and which belongs to said particular LDF, a portion of this word, containing an address of the exit, being printed on one line, and a portion of the word, containing an address of the entrance of the "following" part, being printed on another line;

l) next, searching for informational words, which contain all exits of the "following" part, and printing out these informational words in a consecutive order of exit numbers, provided that a word with an exit, which belongs to said particular LDF, is being printed the last so that a portion of this word, containing an address of the exit, is being printed on one line, and another portion of this word, containing an address of an entrance of a next "following" non-routine part, is being printed on another line;

m) repeating this search until a last logical part, at which LDF stops, is reached, whereby a linear data flow containing all related non-routine parts and subroutine parts is printed out in a textual form.

* * * * *